(12) United States Patent
Hutter et al.

(10) Patent No.: US 8,388,046 B2
(45) Date of Patent: Mar. 5, 2013

(54) BODY STRUCTURE FOR A MOTOR VEHICLE

(75) Inventors: Volker Hutter, Altenriet (DE); Juergen Wittenberg, Bietigheim-Bissingen (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 127 days.

(21) Appl. No.: 13/100,463

(22) Filed: May 4, 2011

(65) Prior Publication Data
US 2011/0309657 A1 Dec. 22, 2011

(30) Foreign Application Priority Data

Jun. 16, 2010 (DE) .......................... 10 2010 017 384

(51) Int. Cl.
*B62D 25/04* (2006.01)
(52) U.S. Cl. ......... 296/193.05; 296/193.06; 296/203.03; 296/187.13
(58) Field of Classification Search ............ 296/29, 296/30, 181.1, 187.01, 187.03, 187.11, 187.12, 296/187.13, 191, 193.02, 193.05, 193.06, 296/193.12, 201, 203.01, 203.03, 203.04
See application file for complete search history.

(56) References Cited

U.S. PATENT DOCUMENTS

| 5,123,696 | A | * | 6/1992 | Watari ..................... 296/203.04 |
| 5,785,378 | A | | 7/1998 | Seefried et al. |
| 6,086,100 | A | * | 7/2000 | Corporon et al. ............. 280/808 |
| 6,644,725 | B2 | | 11/2003 | Braitmaier et al. |
| 6,910,732 | B2 | * | 6/2005 | Miyoshi et al. .......... 296/203.03 |
| 7,083,225 | B2 | * | 8/2006 | Yakata et al. ............. 296/203.04 |
| 7,467,821 | B2 | | 12/2008 | Wolkersdorfer |
| 7,866,738 | B2 | * | 1/2011 | Andou et al. ................. 296/198 |
| 8,011,719 | B2 | * | 9/2011 | Walter et al. ............. 296/203.04 |
| 2011/0278880 | A1 | * | 11/2011 | Tsuyuzaki et al. ....... 296/187.11 |

FOREIGN PATENT DOCUMENTS

| DE | 195 22 680 | 5/1996 |
| DE | 100 01 989 | 7/2001 |
| DE | 101 49 988 | 4/2003 |
| DE | 10 2006 012 628 | 9/2007 |
| EP | 1 702 833 | 9/2006 |

* cited by examiner

*Primary Examiner* — Glenn Dayoan
*Assistant Examiner* — Jason S Daniels
(74) *Attorney, Agent, or Firm* — Gerald E. Hespos; Michael J. Porco (57) ABSTRACT

The body structure of a motor vehicle has a reinforcing support that runs directly adjacent to an upper cutout edge for the rear side window. The reinforcing support has a downwardly curved rear end held in a body-mounted supporting bracket and is connected to a reinforcing element. The reinforcing element is arranged adjacent to a rear edge of the rear side window and is connected to an inner side part. The reinforcing element forms a vertically oriented C pillar for force flux diversion into the body shell structure.

8 Claims, 7 Drawing Sheets

BODY STRUCTURE FOR A MOTOR VEHICLE

CROSS REFERENCE TO RELATED APPLICATION

This application claims priority under 35 USC 119 to German Patent Application No 10 2010 017 384.3 filed on Jun. 16, 2010, the entire disclosure of which is incorporated herein by reference.

BACKGROUND OF THE INVENTION

1. Field of the Invention

The invention relates to a body structure for a motor vehicle with lateral roof frames, and outer and inner side parts between which a reinforcing support is arranged in the roof frame, the reinforcing support extending to the rear beyond a cutout for a rear side window of the vehicle.

2. Description of the Related Art

EP 1 702 833 B1 discloses a body structure for a passenger vehicle with lateral roof frames, rear side parts and suspension strut receptacles. The lateral roof frames are connected to transversely extending supports. A central reinforcement is provided to reinforce the lateral roof frame. The central reinforcement has a long limb running in the longitudinal direction of the vehicle and a short angled limb running in the transverse direction of the vehicle.

It is an object of the invention to reinforce the rear region of a body structure of a motor vehicle so that the reinforcement supports and absorbs forces in the region of a C pillar in the event of a "roof drop test".

SUMMARY OF THE INVENTION

The invention provides a motor vehicle body structure that is reinforced in the region of a rear side window of the vehicle and stiffens the upper roof structure sufficiently to support forces in a "roof drop test". These effects are achieved by a reinforcing support and a reinforcing element. The reinforcing support runs directly adjacent an upper cutout edge for the rear side window and is held at a rear end of downwardly curved design in a body-mounted supporting bracket. The reinforcing element is adjacent a rear edge region of a cutout for the rear side window. The reinforcing element is connected to the reinforcing support and is connected to the inner side part of the vehicle. Additionally, the reinforcing element forms a vertically oriented C pillar having a force flux diversion into the body shell structure. This arrangement of the supporting bracket, the reinforcing element and the reinforcing support achieves a shortened effective lever arm formed by the length of the reinforcing support, which is shortened by the reinforcing element, particularly in vehicles without a continuous B pillar. Therefore the roof is less likely to penetrate into the vehicle interior in a manner that would put occupants at risk.

The reinforcing element that forms the C pillar has a profiled shaped part provided with flanges. A front flange is connected to a delimiting flange of the rear side window and other flanges are connected to the inner side part and to the reinforcing support. Thus, the reinforcing element is connected stably to the vehicle body shell.

The reinforcing element preferably has a triangular opening for absorption and force dissipation purposes. The triangular opening tapers from the bottom to the top at an acute angle and force paths for transmitting force into the body shell structure are formed on both sides of the opening. The triangular opening in the reinforcing element influences absorption and dissipation of forces in a specific manner by said. The opening in the reinforcing element could be in a shape other than triangular. As an alternative the reinforcing element also have no opening.

The reinforcing element forms the C pillar of the vehicle and is held in an approximately central region on the reinforcing support in such a manner that the effective, shortened lever arm is formed for introducing force from the roof into the body shell structure. In particular, the reinforcing element is arranged directly behind the cutout for the rear side window. This achieves the short lever arm of the reinforcing support, since the front flange section of the reinforcing element rests directly on and is connected to the flange of the rear side window.

The reinforcing support preferably is in the form of a profiled shell with two interconnected parts of differing material strength. These parts are connected to the inner side part and to the lateral roof frame. The front part of the reinforcing support is connected to the roof frame and is formed of a high-strength, hot-deformed material. The adjoining rear part of the reinforcing support is formed from a material permitting deformation. The front part of the reinforcing support may have a cross section that disadvantageously is delimiting, but the high-strength, hot-deformed material compensates for this delimiting. By contrast, deformation consciously is permitted in the rear part of the reinforcing support due to the specific selection of the material and strength of the material. The division of the reinforcing support into two parts enables the cross section and the material quality of the reinforcing support, the supporting bracket and the reinforcing element to be selected to correspond to the forces that occur.

The rear downwardly curved end of the reinforcing support preferably is wider than the central part to achieve a sheet-like introduction of forces into the supporting bracket arranged therebelow. Thus, forces are not introduced into the body shell structure in a pointwise manner, but rather are distributed over a large area.

A longitudinal opening preferably is arranged in the enlarged cross-sectional region of the curved end. The longitudinal opening preferably is rectangular. This specifically permits deformation of the reinforcing support in the curved region so that forces can be absorbed. The longitudinal opening could have another shape.

The body-mounted supporting bracket may have a sheet metal part that preferably has a U-shaped profile in cross section. The supporting bracket preferably has bent-out flanges connected to the inner side part and a bent-out flange that connects to a flange of a suspension strut receptacle. The bent-out flanges of the supporting bracket face flanges of the rear lower end of the reinforcing support. This supporting of the reinforcing support at the rear end via the body-mounted supporting bracket absorbs forces and introduces those forces into the body shell structure.

An exemplary embodiment of the invention is illustrated in the drawings and is described in more detail below.

DETAILED DESCRIPTION OF THE PREFERRED EMBODIMENTS

Figure 1:
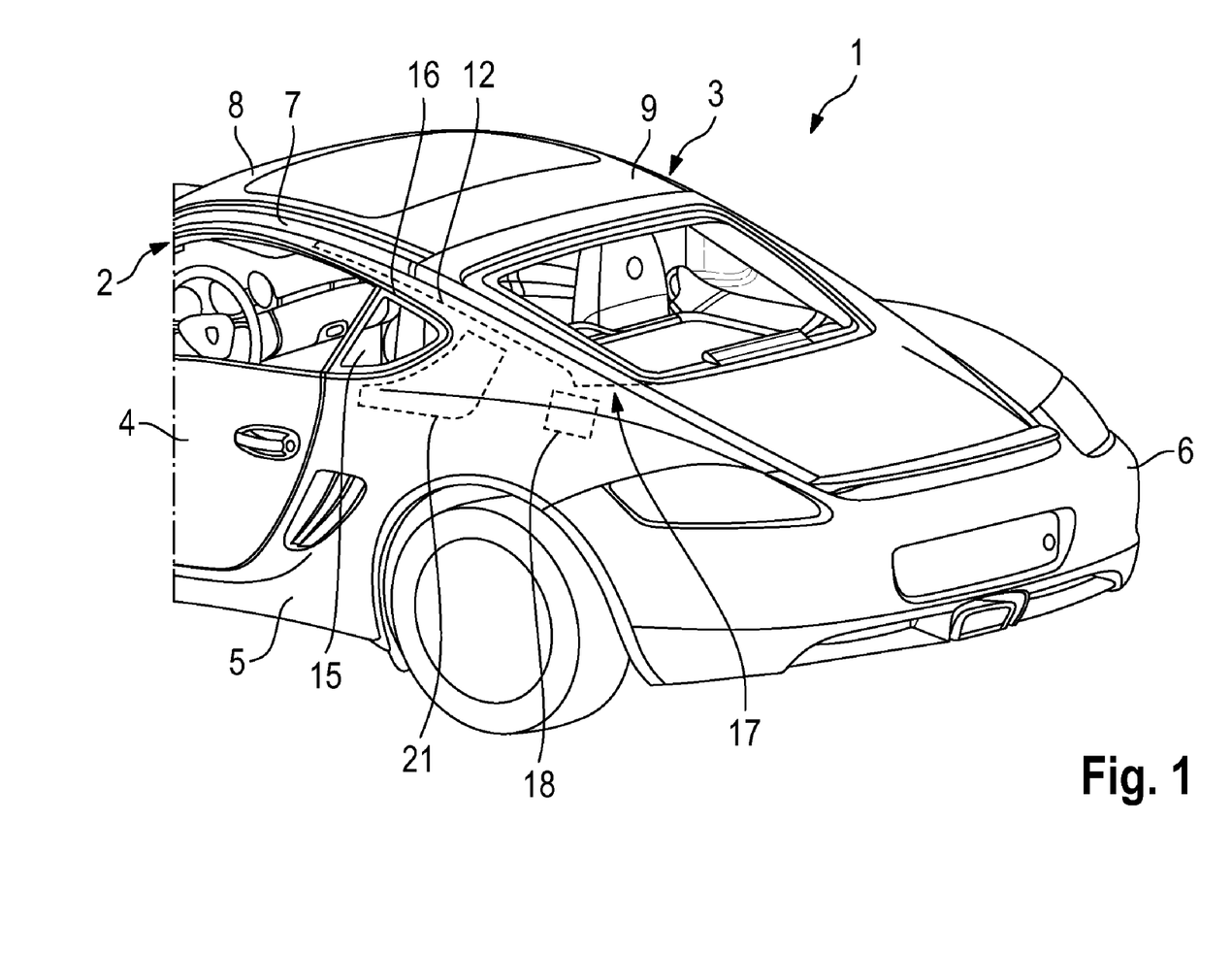
FIG. 1 is a diagrammatic illustration of a vehicle with the reinforcing support, reinforcing element and supporting bracket shown in dashed lines.
Figure 2:
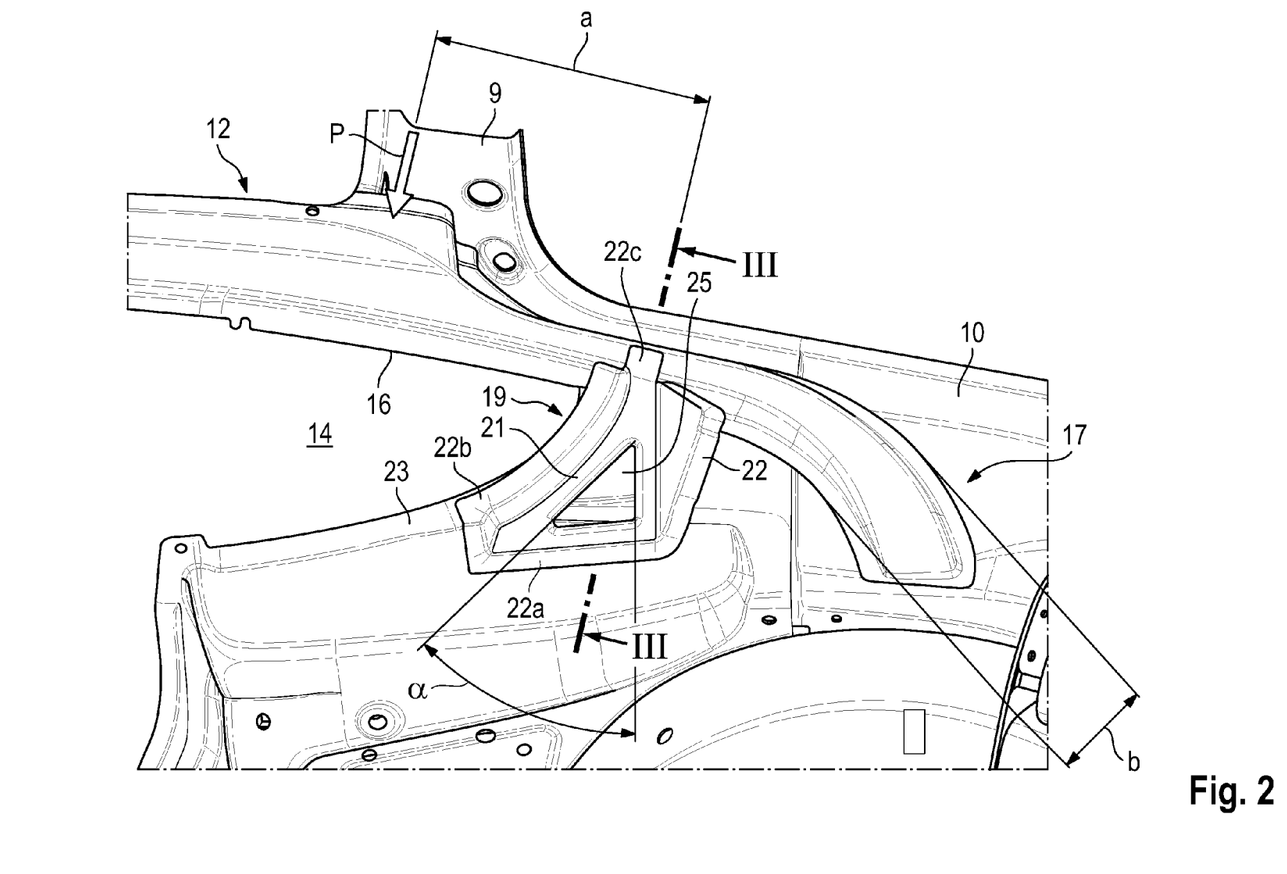
FIG. 2 is an enlarged illustration of the reinforcing support with the reinforcing element behind a rear side window.
Figure 3:
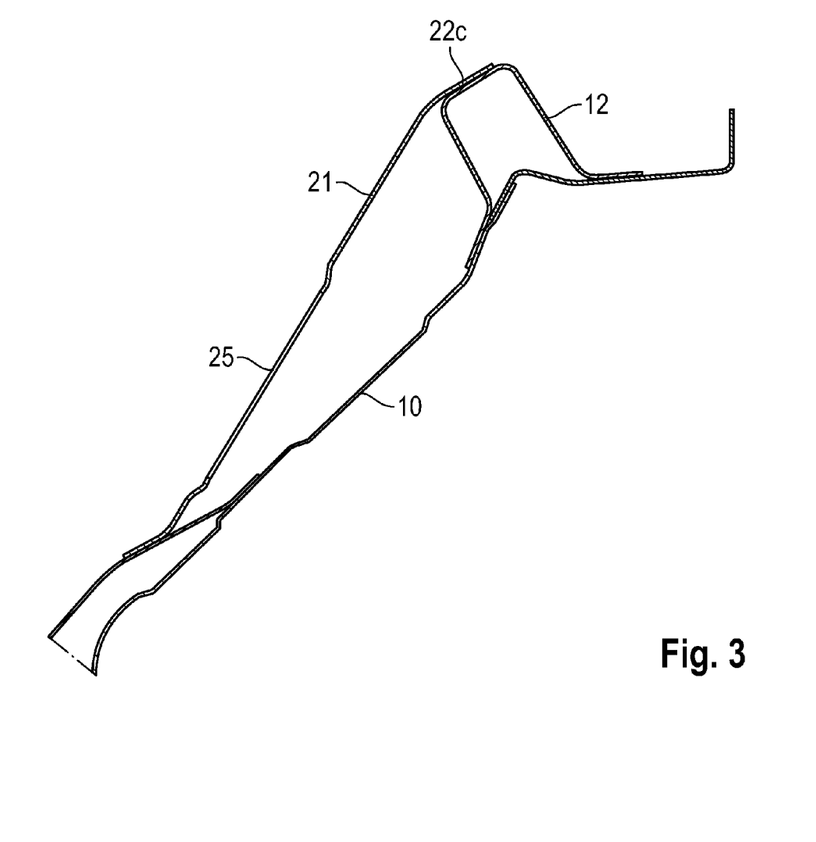
FIG. 3 is a section along the line III-III through the reinforcing support and the reinforcing element.
Figure 11:
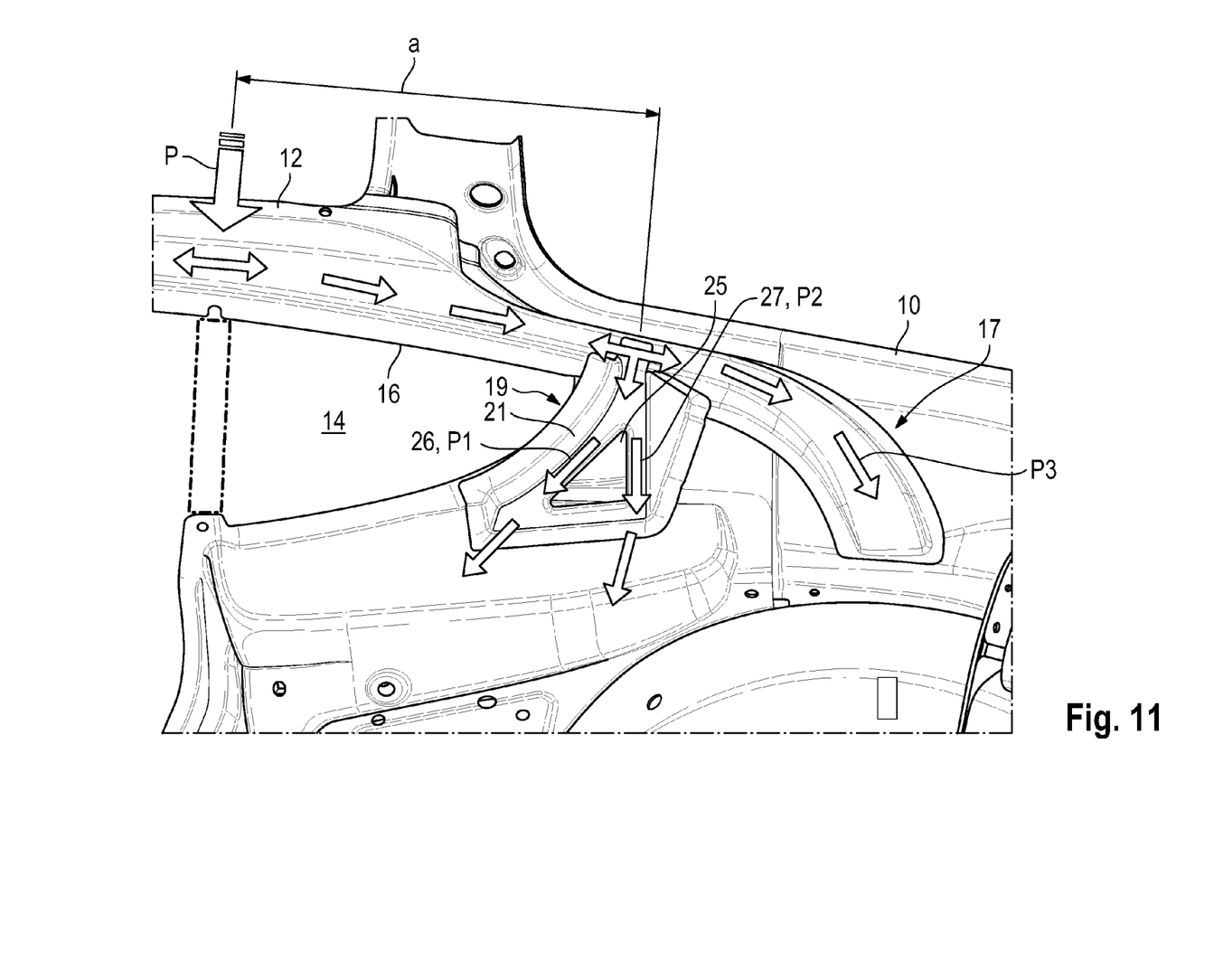
FIG. 11 is an illustration of the introduction of force from the roof into the "C pillar" and into the supporting element.

A motor vehicle 1 has a body structure 2 with a roof 3, side doors 4, side parts 5 and a rear part 6. Elongate lateral roof frames 7 define hollow supports that extend along the roof 3 on each longitudinal side of the motor vehicle 1. The roof frames 7 are interconnected via supports 8 and 9 that run transversally. A reinforcing support 12 extends to the rear beyond a cutout 14 for a rear side window 15 of the vehicle 1 and is arranged in regions in the roof frame 7 and between inner and outer side parts 10 and 11 of the body structure 2. The vehicle 1 does not have a continuous B pillar, as shown in FIG. 11 by chain-dotted lines, and therefore force is introduced essentially only via the C pillar.

The reinforcing support 12 is arranged with a section running directly adjacent to an upper cutout edge 16 for the rear side window 15. Additionally, the reinforcing support 12 has a downwardly curved rear end 17 fastened in a supporting bracket 18 and connected to the inner side part 10.

A vertically oriented C pillar is arranged in the region of the rear edge region 19 of the cutout 14 for the rear side window 15 and is defined by a reinforcing element 21. The reinforcing element 21 forms a force flux diversion from the roof 3 via the reinforcing support 12, to the reinforcing element 21 and into the body shell structure of the vehicle 1.

The reinforcing element 21 of the C pillar preferably is a profiled shaped part provided with flanges 22, 22a, 22b and 22c. More particularly, a front flange 22b is connected to a delimiting flange 23 of the window cutout 14. Rear and bottom flanges 22, 22a are connected to the inner side part 10, and a top flange 22c is connected to the reinforcing support 12. The reinforcing element 21 has an opening 25 for absorption and force dissipation purposes. The opening 25 is triangular in the exemplary embodiment and tapers from the bottom to the top at an acute angle $\alpha$. Force paths 26, 27 for transmitting force into the body shell structure are formed on both sides of the opening 25. The opening 25 could have another shape.

Figure 10:
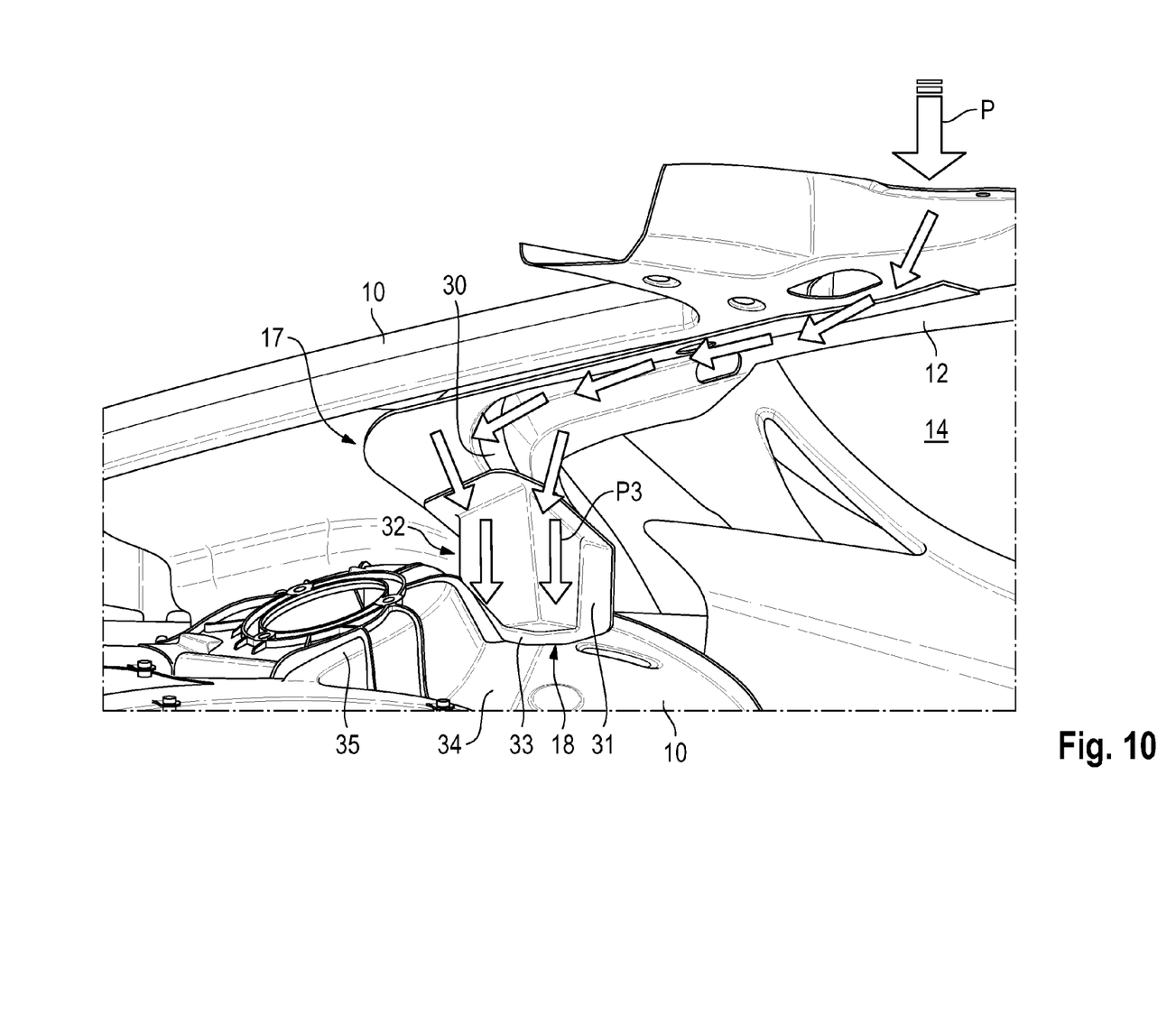
FIG. 10 is an inside view of the reinforcing support with the supporting bracket and showing the introduction of force from the roof of the vehicle into the reinforcing element and the supporting bracket.

The reinforcing element 21 functions as the C pillar of the body shell structure on the end of the cutout 14 and is arranged in a central region of the reinforcing support 12 so that a shortened effective lever arm of dimension "a" is formed for introducing force from the roof 3 into the body shell structure, as depicted in more detail in FIGS. 10 and 11. Force introduced in a roof drop test is illustrated by the arrow P and is distributed primarily via the C pillar, i.e. via the reinforcing element 21, into the body shell, as shown in detail by the force arrows P1 and P2. Further small forces are introduced into the body shell structure via the curved end 17 of the reinforcing support 12, as shown in more detail by the force arrows P3.

Figure 4:
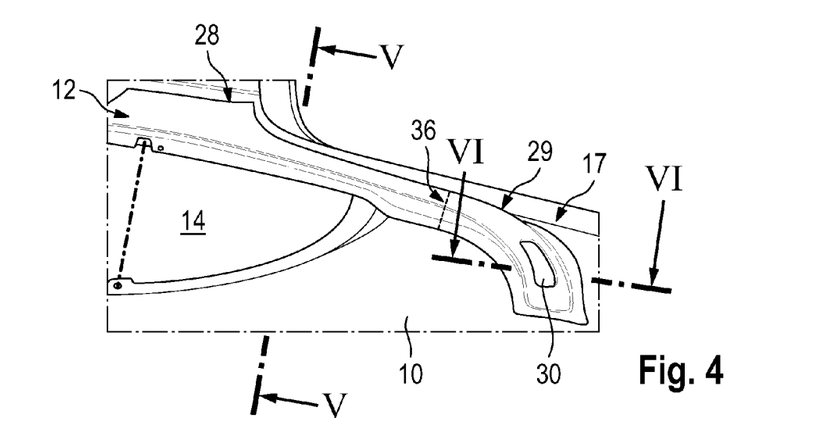
FIG. 4 is a side view of the reinforcing support consisting of two parts.
Figure 5:
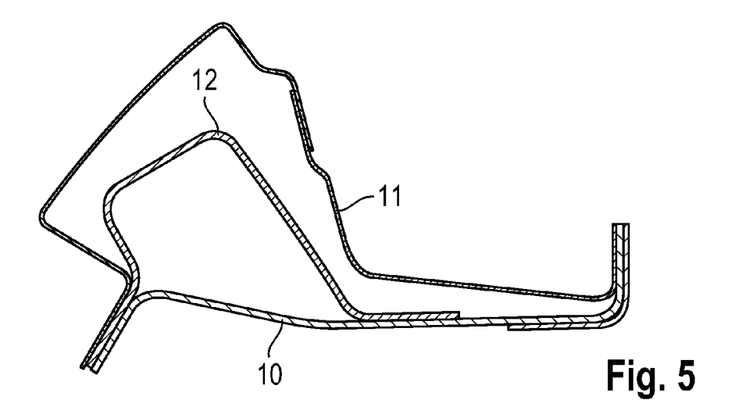
FIG. 5 is a section along the line V-V in FIG. 4.
Figure 6:
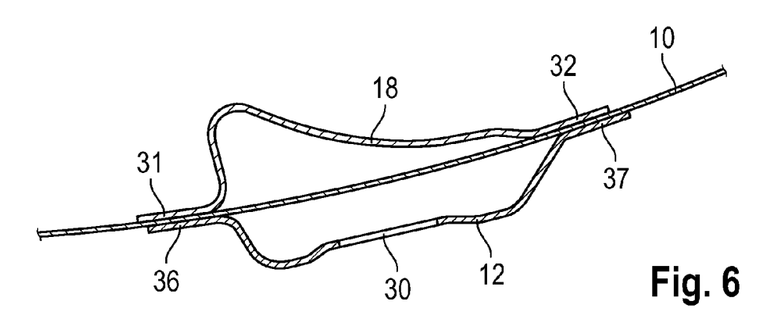
FIG. 6 is a section along the line VI-VI in FIG. 4.
Figure 7:
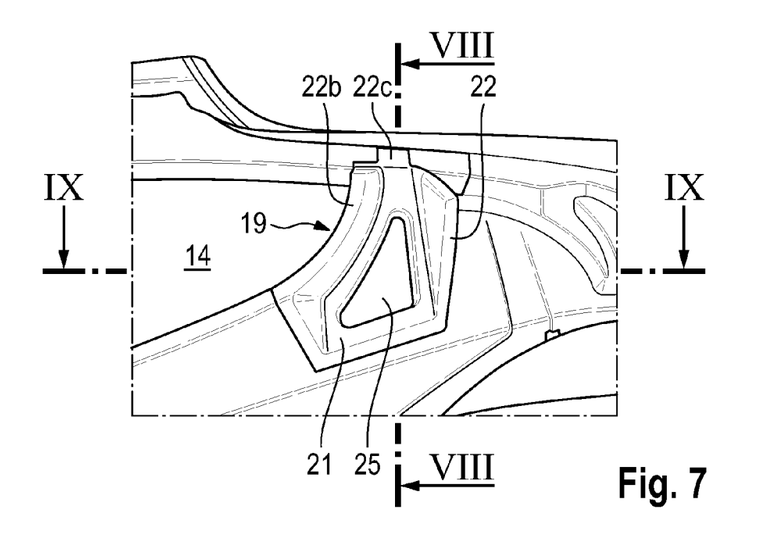
FIG. 7 is a side view of the reinforcing element with the reinforcing support.
Figure 8:
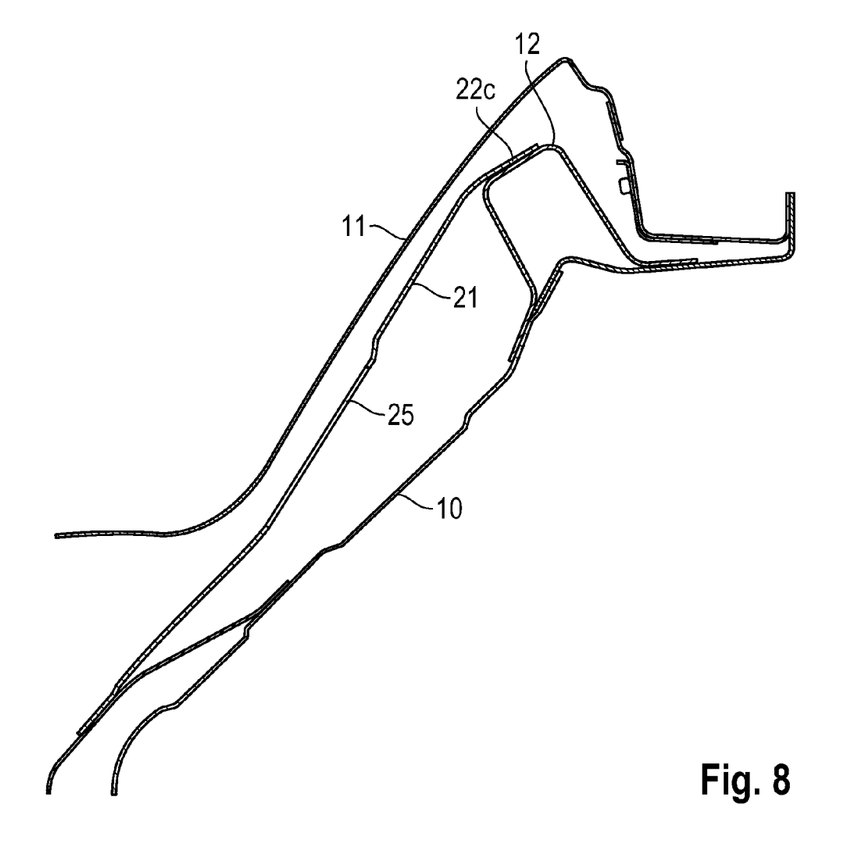
FIG. 8 is a section along the line VIII-VIII in FIG. 7.
Figure 9:
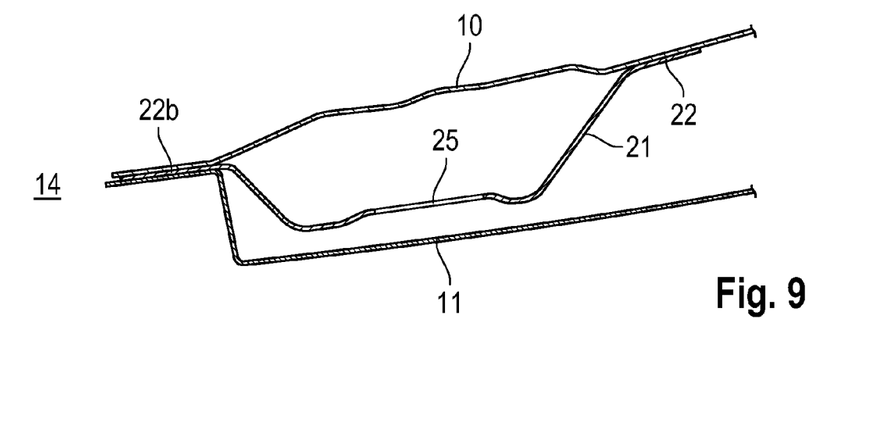
FIG. 9 is a section along the line IX-IX in FIG. 7.

The reinforcing support 12 preferably comprises two parts 28, 29 that are profiled in the form of a single shell and are interconnected in the region 36 (FIG. 4). The parts 28 and 29 have differing material strengths. A front part 28 is connected to the roof frame and consists of a high-strength, hot-deformed material and the adjoining rear part 29 consists of a material permitting deformation, this being influenced by the strength of the material and by the type of the material itself.

The rear, downwardly curved end 17 of the reinforcing support 12 has a larger cross-sectional width "b" than the central part of the reinforcing support 12. The larger width "b" achieves a sheet-like introduction of forces into the supporting bracket 18 arranged therebelow. A longitudinal opening 30 having a preferably rectangular shape is arranged in the enlarged cross-sectional region.

The body-mounted supporting bracket 18 comprises a profiled sheet metal plate in cross section and is connected by bent-out flanges 31, 32 to the inner side part 10 and on a bent-out flange 33 to a flange 34 of a suspension strut receptacle 35.

The reinforcement of the C pillar is a structural member that stiffens the body shell structure and functions to support the forces in the rear vehicle region in the event of the roof drop test. This reinforcement shortens the effective lever arm and thus is particularly helpful for reducing penetration of the roof into the interior of the vehicle 1 or other vehicles that have no continuous B pillar. The front flange of the C pillar reinforcement or the reinforcing element 21 rests with a flange 22b on the flange 23 of the rear side window 15 so that the lever arm to be as short as possible. The absorption and therefore dissipation of the forces can be influenced in a specific manner by manipulating variables of material, strength of the material and by the position and shape of the depicted opening 25.

What is claimed is:

1. A body structure for a motor vehicle, with lateral roof frames and inner and outer side parts, the body structure of each of the lateral roof frames comprising: a reinforcing support running directly adjacent an upper cutout edge for a rear side window of the motor vehicle and extending rearward beyond the cutout for the rear side window, the reinforcing support having a downwardly curved rear end held in a body-mounted supporting bracket, and a reinforcing element connected to the reinforcing support, said reinforcing element being arranged adjacent to a rear edge region of the rear side window and being connected to the inner side part to form a vertically oriented C pillar defining a force flux diversion into a body shell structure of the vehicle.

2. The body structure of claim 1, wherein the reinforcing element has a profiled shaped part provided with a front flange connected to a delimiting flange of the rear side window, rear and bottom flanges connected to the inner side part, and a top flange connected to the reinforcing support.

3. The body structure of claim 1, wherein the reinforcing element has a triangular opening for absorption and dissipation of forces, the triangular opening tapering from a bottom end to a top end at an acute angle $\alpha$, force paths for transmitting force being formed on both sides of the opening.

4. The body structure of claim 1, wherein the reinforcing element is held in a central position on the reinforcing support to form an effective lever arm for introducing force from the roof into the body shell structure.

5. The body structure of claim 1, wherein the reinforcing support is profiled in the form of a single shell and comprises front and rear interconnected parts of differing material strengths, the front part of the reinforcing support being connected to the roof frame being formed from a high-strength, hot-deformed material and the rear part of the reinforcing support being connected to the inner side part and being formed from a material permitting deformation.

6. The body structure of claim 1, wherein the rear, downwardly curved rear end of the reinforcing support has a larger cross-sectional width than a central part of the reinforcing support for causing a sheet-like introduction of forces into the supporting bracket arranged therebelow.

7. The body structure of claim 6, wherein a longitudinal opening is formed in the larger cross-sectional region of the curved rear end of the reinforcing support.

8. The body structure of claim 1, wherein the body-mounted supporting bracket comprises a sheet metal part having a U-shaped profile in cross section, and is connected via first and second bent-out flanges to the inner rear side part and by a third bent-out flange to a flange of a suspension strut receptacle, and the first and second bent-out flanges of the supporting bracket facing flanges of the downwardly curved rear end of the reinforcing support.

* * * * *